Feb. 2, 1926.  
W. F. LAUTENSCHLAGER  
1,571,206  
MACHINE ELEMENT  
Filed Dec. 28, 1923
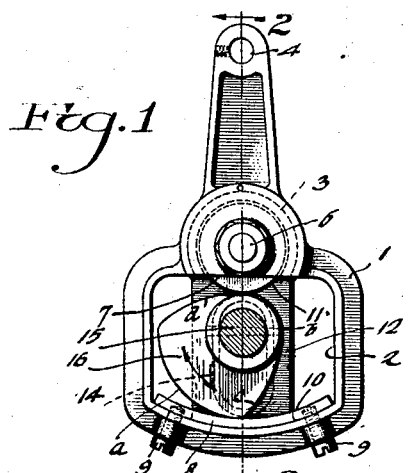
Fig.1
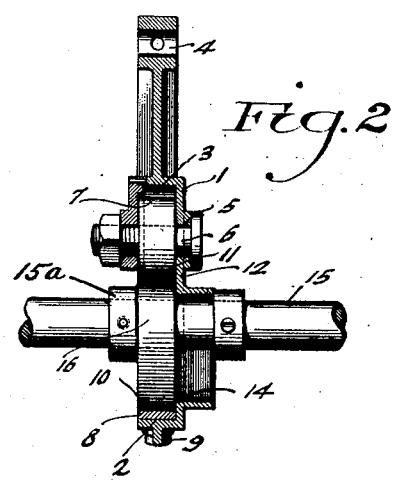
Fig.2
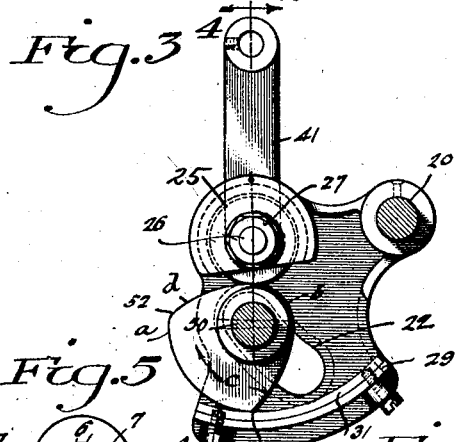
Fig.3
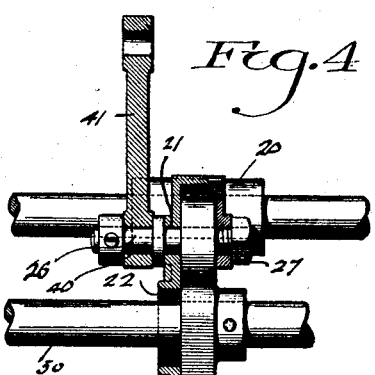
Fig.4
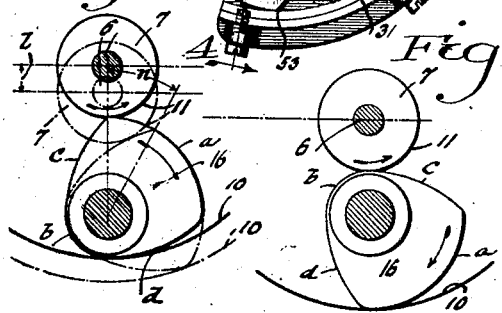
Fig.5 Fig.6
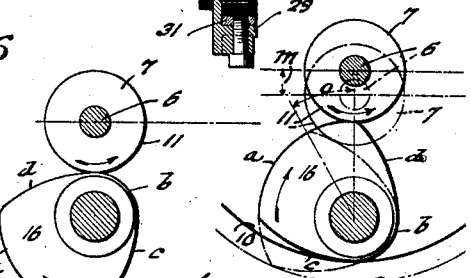
Fig.7 Fig.8
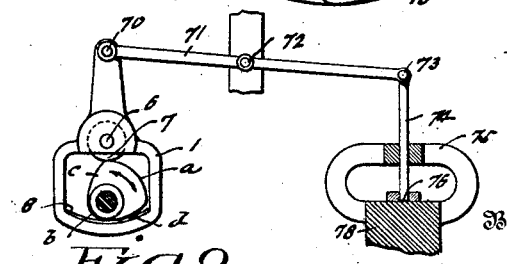
Fig.9
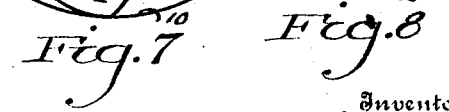
Inventor  
William F. Lautenschlager  
By  
Attorneys Patented Feb. 2, 1926.

1,571,206

UNITED STATES PATENT OFFICE.

WILLIAM F. LAUTENSCHLAGER, OF CINCINNATI, OHIO.

MACHINE ELEMENT.

Application filed December 28, 1923. Serial No. 683,095.

*To all whom it may concern:*

Be it known that I, WILLIAM F. LAUTENSCHLAGER, a citizen of the United States, and residing at Cincinnati, in the county of Hamilton and State of Ohio, have invented a new and useful Machine Element, of which the following specification is a full disclosure.

This invention relates generally to improvements in cam operable oscillatory machine elements, pitmans, links or yokes, such as are used as intermediates for connecting or coupling various machine parts, and which are adapted for converting rotary, into oscillatory or reciprocatory motion.

An object is to produce a pitman, yoke or frame as a reciprocable connecting link which provides means for reducing friction between the driving element, as a cam or eccentric, and the bearing or thrust receiving surfaces of the gibs of the frame, link or yoke, particularly on the forward or power stroke of the cam, this object being principally accomplished by providing the yoke with opposingly related curved bearing or thrust receiving surfaces, respectively rotative and stationary, thus obtaining rolling contact between the cam and one of the thrust receiving surfaces.

Another object is to provide a pitman or link having gib or bearing surfaces designed for reducing friction between those surfaces and the cam or eccentric coacting therewith, thereby increasing the life of the gibs, this object being accomplished by providing concentric curved instead of straight gibs.

Another object is to provide a design of cam which in conjunction with the relatively movable and stationary concentrically related curved bearing surfaces of my improved yoke, will procure a relatively larger oscillatory movement of the yoke or frame for a given angular movement of the driving cam, at certain positions in cam movement, this increased movement being considerably greater than that obtainable with devices of similar character having straight parallel opposingly related bearing or cam engaging surfaces.

Another object is to provide a device for converting rotary into translative or oscillative motion, in which the rotary member constantly and simultaneously engages spaced opposingly related thrust elements of the oscillatable member and in which the configuration of the rotary member is such as to procure relatively rapid and slow movements of the oscillatable member as well as pauses of the member at opposite limits of movement.

Another object is to provide a cam adapted to cooperate with a movable member, such as a pitman, to move said member, near the beginning and end of the cam cycle, respectively at gradually increasing and decreasing speeds during a certain period of cam travel.

Other objects and certain advantages will appear from the description of the drawings, in which drawings:

Figure 1 is a face view of my improved yoke or link.

Figure 2 is a longitudinal section thereof, on line 2—2 of Fig. 1.

Figure 3 is a second form of yoke or link involving the principles of my invention.

Figure 4 is a longitudinal section on line 4—4 of Fig. 3.

Figures 5, 6, 7 and 8 are diagrammatic views showing the operating relations between the parts of my device.

Figure 9 is a diagrammatic view showing the link in operative connection with one form of mechanism.

The numeral 1 designates a substantially rectangular frame, as a head, providing an opening 2, in this instance defined by three straight sides and a curved side and also providing a circular pocket 3 at one side of the opening 2 as a housing for a rotatable gib hereinafter described. At one side of the frame 1 projects a connector arm having a bearing 4 at its outer end adapted to receive a pivot by which the link can be connected with the mechanism to be operated. Upon the arm adjacent the opening 2 is provided a transverse opening 5 as a bearing at the center of the pocket or housing 3, which bearing is traversed by a headed bolt or pivot or journal 6 upon which is rotatably mounted a roller or friction element 7 which projects into or intersects the opening 2. The housing is closed by a plate which forms the opposite bearing for the bolt pivot 6. Mounted within the opening against the curved side is a curvilinear gib or bearing shoe 8 detachably held by screws 9, the bearing surface 10 of which gib is parallel with the bearing surface 11 of the roller 7 and concentric with the axis of the pivot 6 of said roller. The frame 1 is further provided laterally with a cross member 12 partially closing the opening 2 and having an elongated slot or opening 14 therein surrounded by a housing. Loosely traversing the slot 14 and at right angles to the face of the frame 1 is a shaft 15 adapted for rotation in suitable bearings not herein shown. Upon this shaft is non-rotatably mounted a cam 16 adapted for constant simultaneous engagement with the thrust or bearing surfaces 11 and 10 respectively of the roller gib 7 and 8.

A collar 15$^a$ in conjunction with one side face of the cam prevents lateral movement of the frame relative to the shaft 15. A yoke or frame is thus provided having a rotatable gib pivoted thereto at one side of the frame opening and having a curved gib at the opposite side of the opening, the bearing face of the gib being concentric to the pivot of the roller.

The cam, or cam crank, herein shown is of substantially triangular curvilinear configuration and is designed to produce four distinct operations upon its translatable companion frame, during each complete rotation. To this end the cam has two diametrically opposed sides $a$, $b$, of relatively different radius, the degree of curvature of which may be varied to suit conditions of use. These sides are connected by corresponding sides $c$, $d$, each having a radius substantially equal to the distance between the opposing bearing surface of the movable and stationary elements of the frame or yoke member. As herein shown, the apices formed by the juncture of the side of greater radius with the adjoining sides are relatively sharp and rounded, this construction being thus designed for containing relatively different degrees of movement between cam and yoke at certain periods of cam rotation. Both apices may be either sharp or rounded, as required.

In operation, see Figures 5, 6, 7 and 8, starting in the direction indicated by the arrow, in this instance in a clockwise direction, and rotating at constant speed, the frame will be moved downwardly, with gradually decreasing speed during that portion of the cam cycle represented by $n$, the angle of movement being in this instance approximately 30°. The distance $l$ which the frame moves during the corresponding movement of the cam through the angle mentioned is relatively much greater than that obtainable when a straight gib is used. For the gib curvature herein shown, the movement obtainable is substantially twice that obtainable by using a straight gib. By correspondingly changing the degree of curvature of the gib 8 the length of the movement $l$ may be either increased or decreased, for example, a smaller radius gives a larger movement, and correspondingly increased speed. The movement of the frame during the first quarter turn of the cam is thus gradually decreased, and during the second quarter turn represented in Figures 6 and 7, the frame is caused to dwell for a relatively short period. During a third quarter rotation the frame is moved in a direction opposite to that shown in Figure 5 at a gradually increasing speed, the last movement of approximately 30° being, as in the case of the corresponding movement shown in Figure 5, at an increased speed, for the distance $m$. During the last quarter turn of the cam the frame will be caused to dwell a relatively long period.

In this instance, the greatest periods of gradually increasing and decreasing speeds are obtained near the beginning and end of the cam cycle during the travel of the cam through an arc of approximately 30°, this effect being obtainable principally on account of the rolling of one curved surface upon the other. The distance and speed of travel of the frame is also materially increased at and near the beginning and end of the cam cycle, and the degree of frame movement at these periods is relatively much greater than is obtainable when the cam operates against straight parallel bearing surfaces.

The modified form of link shown in Figures 3 and 4 comprises a frame of irregular configuration having a transverse bearing 20 at one corner and having a second transverse bearing 21 at the opposite corner, this bearing being identical in construction with that of the first form. Both bearings are located relatively along one side of the frame. The frame is slotted as at 22, the axis of the slot being concentric with the axis of the bearing 20. Attached with the housing at one side of the frame is a circular roller gib 25 pivoted in the bearing 21 by means of a headed bolt 26 suitably secured against withdrawal by the nut 27. At the side of the frame opposite that of the bearing 21 a curvilinear shelf 29 projects at right angles therefrom the said shelf being concentric with the axis of the bolt 26 and therefore parallel with the bearing periphery of the roller 25. Upon this shelf or projection 29 is detachably secured a curved gib 31, the bearing surface of which is opposingly related to the bearing or thrust surface of the roller 7 and is concentric with the axis of the bolt 26, and, therefore, with the pivot of the roller. The bolt 26 also traverses the eye 40 of the link 41, which link is adapted to be connected at its opposite end to any suitable machine part desired to be operated by the link or yoke. The bearing 20 is also designed to be attached by a suitable device to the frame or support upon which the yoke is pivoted no connections for either link, yoke or frame being herein shown.

Loosely traversing the slot 22 is a rotatable shaft 50 mounted in suitable bearings, not herein shown, and attached to said shaft is the substantially triangular curvilinear cam 16 pinned non-rotatably to the shaft as in the first form. This cam is adapted to simultaneously and constantly frictionally engage the roller 25 and the gib 31 as in the first mentioned form, whereby no play is permitted between the cam roller and gib and whereby when the cam is rotated rolling contact between the cam and roller is obtained. The forward or power stroke of the cam is directed against the roller 25 and, because of the pivoting of the roller, the friction between the parts upon the stroke is substantially reduced.

As before indicated in detail, when the cam is rotated as shown, in the direction of the arrow, from its position in Figure 3 the frame is swung upwardly about its pivot the speed gradually increasing until the apex of the cam engages the roller, which movement corresponds to a quarter turn of the cam. After this the frame remains stationary during a relatively long period until the apex 53 of the cam engages the roller, whereafter during the next quarter turn of the cam the frame is lowered with a gradually decreasing speed. During the next quarter turn, a relatively short dwell of the frame in this lowermost position is obtained. Thereafter the cycle is repeated. By rounding the cam at its apices in varying degrees the character of the motion of the frame may be varied or, as shown herein, one apex may be rounded and the other may be pointed to obtain in one case a gradual movement of the frame as the apex approaches the roller or in the other instance an abrupt movement of the frame. It is obvious that the direction of rotation of the cam may be changed to suit conditions.

In Figure 9 the first form of the link is shown connected with a mechanism which is designed to illustrate the device as a mechanical movement and showing the movements obtainable for a tool, in this instance a punching tool, with reference to its anvil. Pivoted to the arm of the link or yoke as at 70 is a lever 71 in turn pivoted to a suitable support as at 72, the extremity of the opposite arm of the lever being pivoted at 73 to a vertically reciprocable element 74 suitably guided as at 75 and having its lower end 76 adapted to engage and disengage an anvil 78. With the cam in the position shown the lower end of the element 74 is engaged with the anvil and it may be assumed that work is at this time being punched. As the cam continues to rotate in a counter-clockwise direction a quarter turn, the end of the element 74 remains in contact with the anvil providing a dwell during which if desired some other operation performed by another part of the machine may take place, it being understood that other elements might be provided which operate in synchronism with the element 74. During the second quarter turn of the cam, the element 74 will be raised from the anvil, with gradually increasing speed after which and during the third quarter of its rotation, a dwell of the element 74 in its uppermost position is obtained.

During the next quarter turn the element descends with gradually increasing speed and thereafter the cycle is repeated.

My device thus provides a frame having thrust receiving members respectively stationary and rotatable, the said members having their bearing surfaces opposingly related and concentric, and constantly engaged with a cam designed to vary the motion of the yoke in a manner to obtain varying speeds of movement of mechanism operatively connected with the yoke.

Although a cam of the preferred configuration has been herein shown, it will be understood that other forms of cams or eccentrics can be used in conjunction with my improved yoke having a rotatable and stationary gib. When using an ordinary form of eccentric, it is obvious that the character of motion of the parts operated by the oscillatory frame will be correspondingly changed.

Having described my invention, I claim:

1. In a device of the class described, a shaft, a frame traversed by said shaft and translatable relative thereto, a roller gib journaled to said frame, a second gib attached to said frame having a curved surface concentric with the axis of said roller, and a cam upon said shaft intermediate said gib surfaces, having its periphery engageable with said surfaces for oscillating said frame.

2. In a device of the class described, a yoke frame having an opening therein, a roller journalled upon said frame at one side of said opening, and a gib at the opposite side of said opening, said gib having a face opposed to the periphery of said roller and concentric with the axis thereof.

3. In a device of the class described, a frame, a rotatable element journalled thereto, and a stationary element upon said frame having a curved surface opposingly related to the peripheral bearing surface of said roller, spaced therefrom, and concentric to the axis of said rotatable element.

4. In a device of the class described, a frame having an opening therein, a rotatable shaft freely traversing said opening, a roller journalled to said frame at one side of said opening, a gib attached to said frame at the opposite side of said opening, said gib having a curved surface opposingly related to the periphery of said roller and concentric with the axis thereof, and a cam upon said shaft disposed intermediate said roller and curved gib surface and adapted to simultaneously and constantly frictionally engage said roller and gib to translate said frame, whereby no play is permitted between the cam, roller and gib whereby rolling contact between cam and roller is obtained.

5. In a device of the class described, a frame, and thrust receiving members upon said frame, said thrust receiving members respectively stationary and rotatable, and having their bearing surfaces opposingly related and concentric.

6. In a device of the class described, a frame having an opening therein and thrust receiving members respectively stationary and rotatably attached to said frame at opposite sides of said opening, said members having their bearing surfaces opposingly related and concentric.

7. In a device of the class described, a rectangular frame having an opening therein, a connector arm extending outwardly from said frame, a circular roller journalled to said arm and partially overlapping said opening, and a curved gib detachably and adjustably secured within the opening in opposition to the periphery of said roller, the bearing surface of said gib being parallel with the bearing surface of said roller.

8. In a pitman having its head provided with a fixed curved bearing shoe surface, a roller journaled in the head, spaced from said shoe surface, the periphery of the roller and curved shoe surface being concentric, and a cam crank engaged with and between said roller and curved shoe surface.

In witness whereof I hereunto subscribe my name.

WILLIAM F. LAUTENSCHLAGER.